(12) United States Patent
Takasaki et al.

(10) Patent No.: US 6,302,631 B1
(45) Date of Patent: Oct. 16, 2001

(54) WOOD SCREW HAVING A HEAD WITH SIDE RIDGES

(75) Inventors: Seiichiro Takasaki, 4-17, Sosha 2-chome, Fujiidera-shi, Osaka (JP); Tsutomu Kashikura, Nara (JP)

(73) Assignee: Seiichiro Takasaki, Osaka (JP)

( * ) Notice: Subject to any disclaimer, the term of this patent is extended or adjusted under 35 U.S.C. 154(b) by 0 days.

(21) Appl. No.: 09/635,590

(22) Filed: Aug. 9, 2000

(30) Foreign Application Priority Data

Sep. 21, 1999 (JP) ................................................ 11-267653
Apr. 6, 2000 (JP) ................................................ 12-104444

(51) Int. Cl.⁷ ................................................ F16B 35/06
(52) U.S. Cl. ................................................ 411/399
(58) Field of Search ................................ 411/399, 403, 411/404, 386

(56) References Cited

U.S. PATENT DOCUMENTS

| 373,074 | * | 11/1887 | Jones | 411/399 |
| 4,655,661 | * | 4/1987 | Brandt | 411/399 |
| 5,015,134 | * | 5/1991 | Gotoh | 411/399 |

FOREIGN PATENT DOCUMENTS

| 1036978 | * | 9/1953 | (FR) | 411/399 |
| 140983 | * | 4/1920 | (GB) | 411/399 |
| 2227540 | * | 8/1990 | (GB) | 411/399 |

* cited by examiner

Primary Examiner—Flemming Saether
(74) Attorney, Agent, or Firm—Wenderoth, Lind & Ponack, L.L.P.

(57) ABSTRACT

A wood screw that can be completely driven into a wooden plate with a small turning torque. It has a shank having a pointed tip at one end and formed with threads. A head is provided at the other end of the shank. The head is in the shape of a pyramid having ridges defining side faces therebetween. A recess for accepting a tip of a screwdriver is formed in the top face of the pyramid head.

4 Claims, 6 Drawing Sheets

WOOD SCREW HAVING A HEAD WITH SIDE RIDGES

BACKGROUND OF THE INVENTION

The invention relates to a wood screw.

Wood screws comprise a threaded shank with a pointed tip at one end thereof and a head at the other end. The head has a recess for accepting a screwdriver tip.

Most wood screws have a conical head. Thus, when a wood screw is driven and the conical head begins to penetrate into a wooden plate, the turning resistance increases suddenly due to large friction. Therefore, a large turning torque is needed to drive the screw completely.

A power screwdriver or a torque wrench with a built-in torque limiter is often used to drive a wood screw into a wooden plate. In such a case, since the turning torque increases suddenly and sharply when the conical head begins to penetrate into the plate, the torque limiter may activate to stop the transmission of turning torque before the head is fully buried in the plate. If this happens, it is impossible to completely drive the screw into the plate. The screw head would remain above the plate surface.

When the conical head begins to penetrate into the plate, it is jammed into the narrow hole formed by the threads on the shank and acts like a wedge. Thus, even if the head is completely buried in the plate, the wooden plate tends to be cracked.

An object of the invention is to provide a wood screw that can be completely driven into a wooden plate with a small turning torque without forming a crack in the wooden plate.

SUMMARY OF THE INVENTION

According to the invention, there is provided a wood screw comprising a shank having a pointed tip at one end and formed with threads, and a head provided at another end of said shank, said head being in the shape of a pyramid having side ridges defining side faces therebetween and having a top surface formed with a recess for accepting a tip of a screw driving tool.

The side faces of the pyramid head defined by the ridges may be flat or arcuately convex or concave in the axial direction of the screw or in the direction perpendicular to the axial direction.

When the pyramid head penetrates into the plate while rotating, the ridges of the pyramid head cut and ream the hole formed by the threads on the shank like drill edges. The head thus sinks smoothly into the plate. Also, the wooden plate is less likely to be cracked.

A rake face may be formed along and in front of each ridge with respect to the rotational direction of the screw when driven into the wooden plate to sharpen the ridges. The thus sharpened ridges will ream the hole formed by the threads on the shank more smoothly, so that the screw can be completely and easily driven into even an extremely hard wooden plate. Also, such sharp ridges can effectively prevent fibrous chips of the plate from heaping along the edge of the opening formed by the ridges because the ridges cut fibers into smaller pieces.

The greater the number of corners or ridges of a polygonal pyramid head, the closer in shape the polygonal pyramid is to a cone, and the greater the angle of each corner or ridge. A corner or ridge having a large angle is correspondingly "dull" as a drill edge. Thus, to provide sufficiently sharp drill edges, the number of corners of the polygonal pyramid head has to be sufficiently small. The practically preferable number of corners of the pyramid head is between four (square pyramid) and six (hexagonal pyramid).

The pyramid head may be formed with a square recess in its top face to receive the tip of a screw driving tool. If the pyramid head is a square one, a cross-shaped recess for accepting a screwdriver tip may be formed in its top surface so that its four grooves extend toward the respective four ridges with their bottoms tapered at the same angle as the ridges to form a deep recess. Since the recess is deep, the screwdriver can strongly engage the wood screw.

Other features and objects of the present invention will become apparent from the following description made with reference to the accompanying drawings, in which:

DETAILED DESCRIPTION OF THE PREFERRED EMBODIMENT

Figure 1:
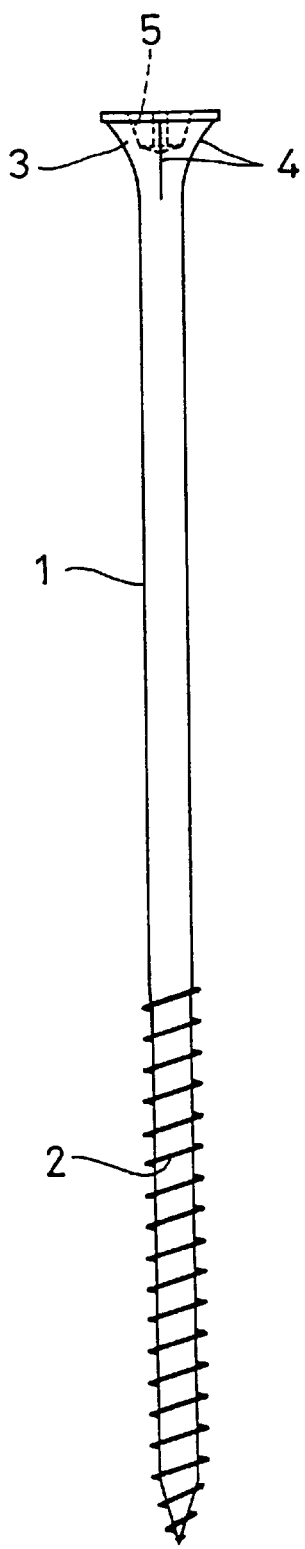
FIG. 1 is a front view of a wood screw embodying the invention.

The wood screw of FIG. 1 has a shank 1 having a pointed tip at one end thereof. Helical threads 2 are formed on the shank 1 from its pointed tip to an intermediate point.

Figure 2:
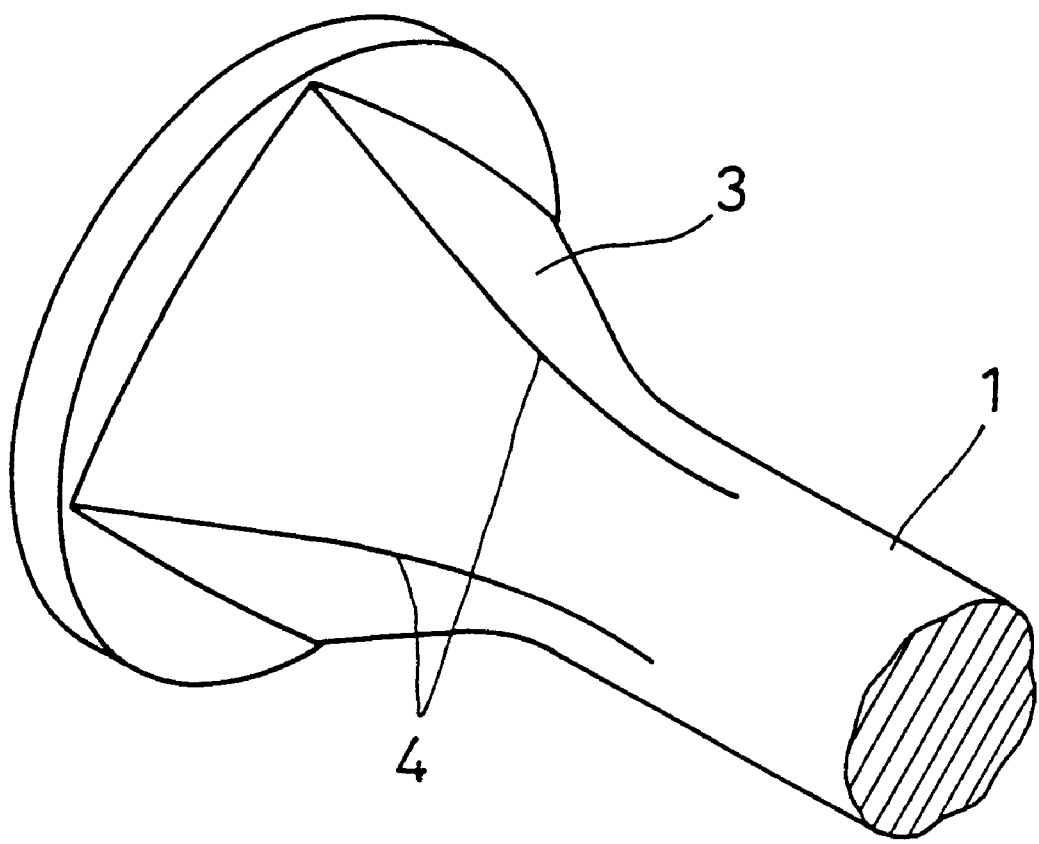
FIG. 2 is a perspective view of the head of the wood screw of Fig. 1.
Figure 3A:
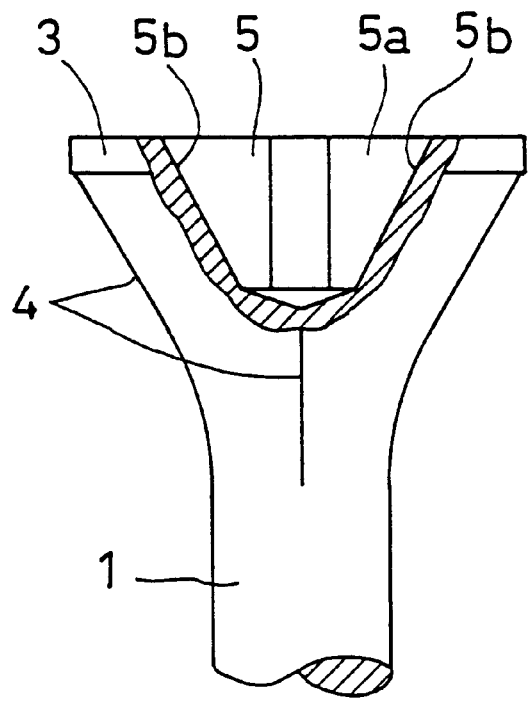
FIGS. 3A and 3B are a partially cutaway front view and a plan view the head of FIG. 2, respectively.
Figure 3B:
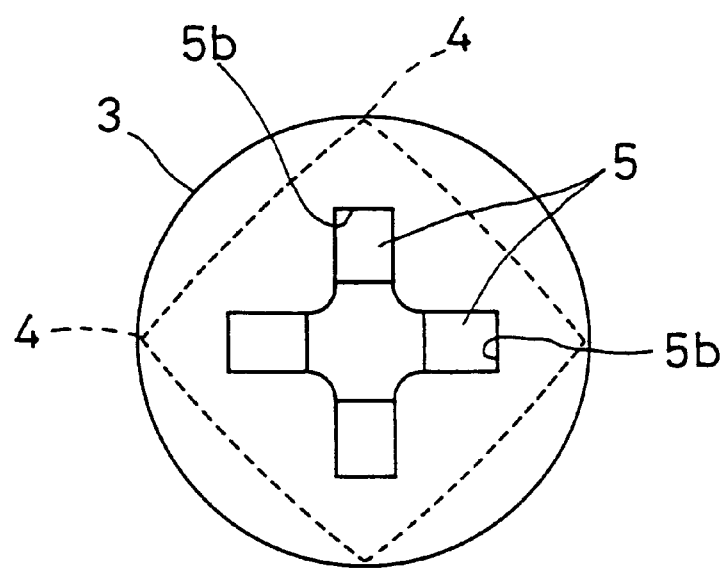

A head 3 is provided at the other end of the shank 1. It has a shape of a truncated square pyramid having four ridges 4 as shown in FIGS. 2, 3A and 3B and includes a circular disk portion formed on top of the pyramid.

Formed in the top face of the head 3 is a cross-shaped recess 5 for accepting a screwdriver tip. The four grooves 5a of the recess 5 radially extend toward the respective ridges 4 as shown in FIG. 3B and have their bottoms 5b tapered or inclined at the same angle as the respective ridges 4 as shown in FIG. 3A and arranged at positions opposed to the ridges 4.

Because the bottoms 5b of the grooves 5a are opposed to the ridges 4, the recess 5 is sufficiently deep. The deep recess ensures secure coupling of a screwdriver tip with the wood screw.

When the screw is driven into a wooden plate and its head 3 begins to penetrate into the plate, the ridges 4 ream the hole formed by the threads 2 like drill edges. Thus, the head 3 penetrates smoothly into the plate without encountering any large turning resistance. It is possible to drive the wood screw completely with a relatively small force. Also, the ridges 4 act as drill edges and do not form any cracks in the plate.

Instead of a square pyramid head as shown, a pentagonal, hexagonal or any other polygonal pyramid head may be used.

FIGS. 4–6B show another embodiment. In this embodiment, instead of the cross-shaped recess, a square recess 5 is formed in the top of the head 3 to receive a torque wrench tip. A rake face 7 is formed along and in front of each ridge 4 with respect to the rotational direction of the threads 2. As viewed from top (FIG. 6B), the rake faces 7 are inclined radially inwardly with respect to the respective side faces 6 defined between the ridges 4.

The rake faces 7 make the ridges 4 sharper. Thus, like the drill edges, the ridges 4 can ream the hole formed by the threads 2 more smoothly than the ridges of the first embodiment. Also, such ridges can effectively prevent a fibrous heap from being formed along the edge of the opening formed by the ridges, because the ridges cut fibers into smaller pieces.

Figure 4:
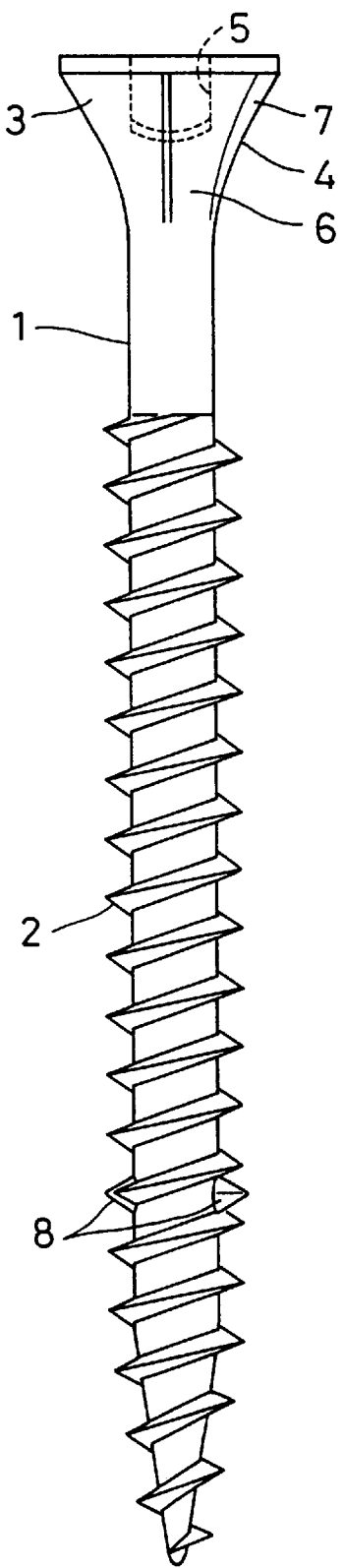
FIG. 4 is a modified wood screw embodying the invention.
Figure 5:
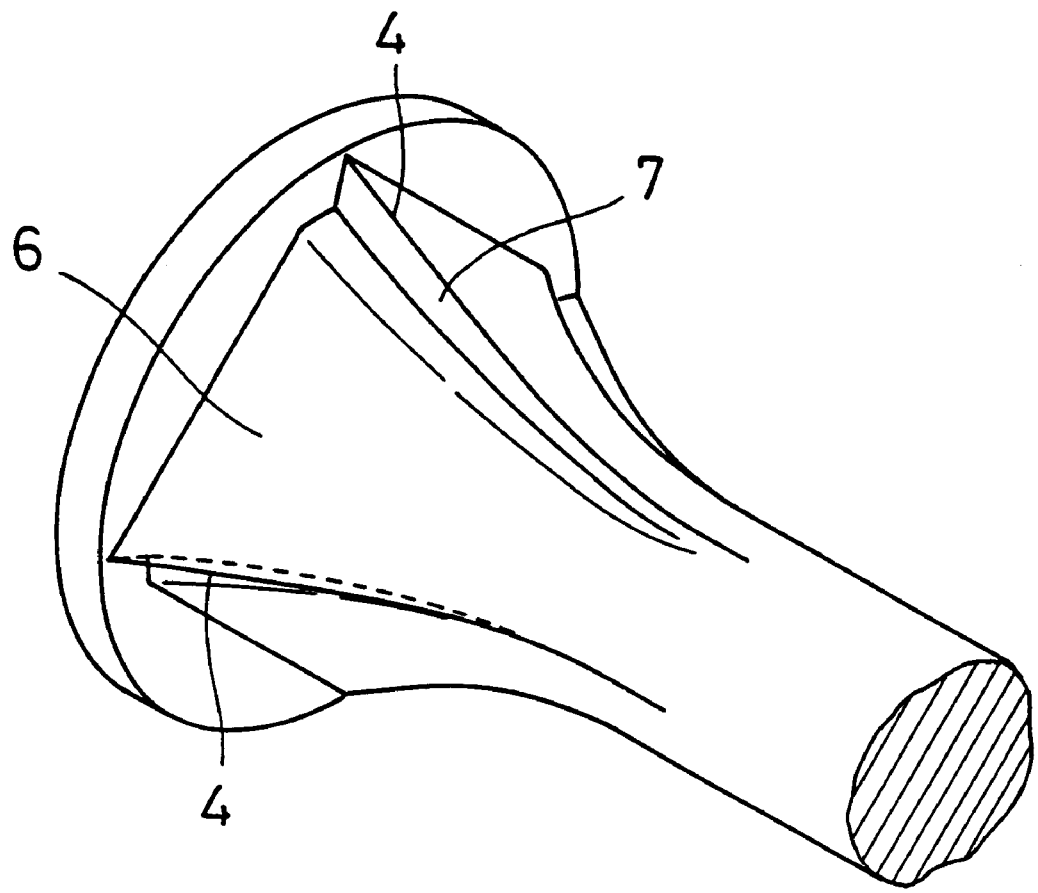
FIG. 5 is a perspective view of the head of the wood screw of FIG. 4.
Figure 6A:
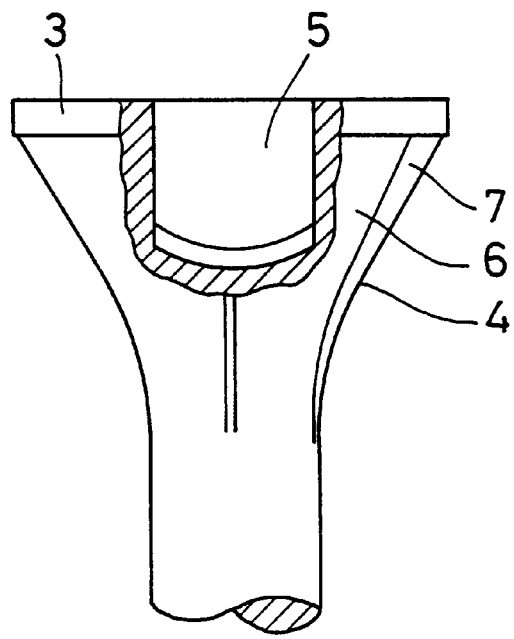
FIGS. 6A and 6B are a partially cutaway front view and a plan view of the head of FIG. 5, respectively.
Figure 6B:
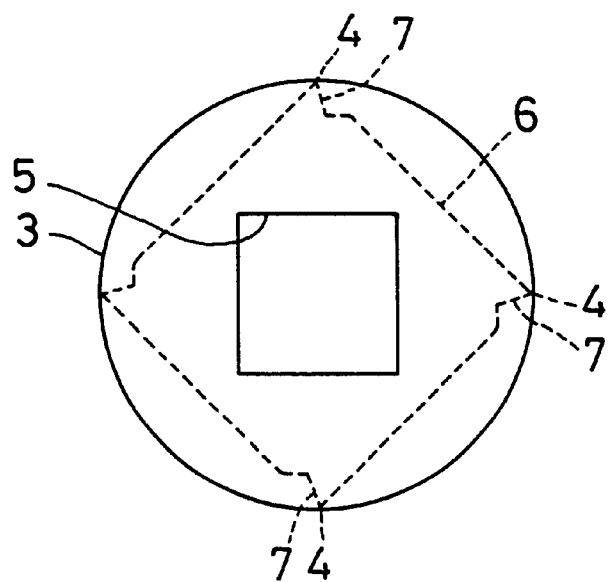

A pair of protrusions 8 are formed on the threads 2 at diametrically opposite positions (FIG. 4). When the shank 1 penetrates into the wooden plate, the protrusions 8 destroy and soften the inner tissue of the plate, thus making it possible to drive the screw easily into the plate with a much smaller torque and with less turning resistance. The thus softened tissue absorbs any expansion force applied to the wooden plate from the screw and thus prevents formation of cracks in the plate.

In either embodiment, the side faces 6 may be flat or convex or concave in the axial or width direction.

We claim:

1. A wood screw comprising a shank having a pointed tip at one end and a head at the other end and formed with threads, said head having a shape of a square pyramid having four ridges and four side faces respectively defined between adjacent pairs of said four ridges, said head having a top surface formed with a recess for accepting a tip of a screw driving said recess is cross-shaped and comprises four grooves extending toward said four ridges, respectively, and having bottom surfaces inclined at substantially the same angles as said four ridges, respectively, wherein rake faces are formed along and in front of said four ridges, respectively, with respect to the direction of rotation of the wood screw, said rake faces being inclined, as viewed from above said head of the screw, radially inwardly with respect to said four side faces, respectively.

2. A wood screw comprising a shank having a pointed tip at one end and a head at the other end and formed with threads, said head comprising an inverted, truncated pyramid portion having ridges defining said faces therebetween and a polygonal top surface, and a circular disk portion formed on top of said polygonal top surface to circumscribe said polygonal top surface, wherein rake faces are formed along and in front of said four ridges, respectively, with respect to the direction of rotation of the wood screw, said rake faces being inclined, as viewed from above said head of the screw, radially inwardly with respect to said four side faces, respectively.

3. The wood screw of claim 2 wherein said pyramid portion of said head comprises a square pyramid portion, said ridges comprise four ridges and said side faces comprise four side faces respectively defined between adjacent pairs of said four ridges.

4. The wood screw of claim 2 wherein said recess is cross-shaped and comprises four grooves extending toward said four ridges, respectively, and having bottom surfaces inclined at substantially the same angles as said four ridges, respectively.

* * * * *